(12) United States Patent
Kato (10) Patent No.: US 11,959,513 B2
(45) Date of Patent: Apr. 16, 2024

(54) FLUID DYNAMIC BEARING DEVICE

(71) Applicant: NTN CORPORATION, Osaka (JP)

(72) Inventor: Daichi Kato, Mie (JP)

(73) Assignee: NTN CORPORATION, Osaka (JP)

( * ) Notice: Subject to any disclaimer, the term of this patent is extended or adjusted under 35 U.S.C. 154(b) by 165 days.

(21) Appl. No.: 17/435,492

(22) PCT Filed: Mar. 25, 2020

(86) PCT No.: PCT/JP2020/013255
§ 371 (c)(1),
(2) Date: Sep. 1, 2021

(87) PCT Pub. No.: WO2020/196599
PCT Pub. Date: Oct. 1, 2020

(65) Prior Publication Data
US 2022/0349442 A1 Nov. 3, 2022

(30) Foreign Application Priority Data

Mar. 26, 2019 (JP) .................................. 2019-059055
Mar. 23, 2020 (JP) .................................. 2020-050522

(51) Int. Cl.
*F16C 17/02* (2006.01)
*F16C 33/10* (2006.01)

(52) U.S. Cl.
CPC .......... *F16C 17/026* (2013.01); *F16C 33/107* (2013.01)

(58) Field of Classification Search
CPC .. F16C 17/026; F16C 33/107; F16C 2360/12; H02K 5/167–1677; H02K 7/083–088
See application file for complete search history.

(56) References Cited

U.S. PATENT DOCUMENTS

| | | | |
|---|---|---|---|
| 3,945,692 A | | 3/1976 | Tsujiuchi |
| 4,553,857 A | * | 11/1985 | Ney ...................... F16C 17/028 384/293 |
| 5,129,739 A | * | 7/1992 | Asai ...................... F16C 33/201 384/909 |

(Continued)

FOREIGN PATENT DOCUMENTS

| | | |
|---|---|---|
| JP | 50-72045 | 6/1975 |
| JP | 52-14160 | 2/1977 |

(Continued)

OTHER PUBLICATIONS

Machine Translation of JP 52-14160 (Year: 1977).*

(Continued)

*Primary Examiner* — Alan B Waits
(74) *Attorney, Agent, or Firm* — Wenderoth, Lind & Ponack, L.L.P.

(57) ABSTRACT

Provided is a fluid dynamic bearing device, including: a shaft member; a bearing sleeve (18) having the shaft member inserted along an inner periphery thereof; and dynamic pressure generating grooves (26) configured to support the shaft member in a relatively rotatable and non-contact manner with pressure of an oil film formed in a radial bearing gap defined between an outer peripheral surface of the shaft member and an inner peripheral surface (24) of the bearing sleeve (18). The dynamic pressure generating grooves (26) include: the large number of polygonal hill portions (27) arranged in a pattern on the inner peripheral surface (24) of the bearing sleeve (18) ; and polygonal groove portions (28) formed in such a manner as to surround the polygonal hill portions (27).

13 Claims, 8 Drawing Sheets

(56) References Cited

U.S. PATENT DOCUMENTS

| | | | |
|---|---|---|---|
| 6,935,787 B2* | 8/2005 | Li .................. | F16C 33/1065 384/292 |
| 7,625,122 B2* | 12/2009 | Huang ............ | F16C 33/107 384/114 |
| 2002/0009243 A1* | 1/2002 | Okamura ........ | F16C 17/026 384/114 |
| 2008/0152529 A1 | 6/2008 | Yoshimura | |
| 2008/0166077 A1* | 7/2008 | Chou ............... | F16C 33/107 384/291 |
| 2012/0294556 A1 | 11/2012 | Kurimura | |
| 2015/0369278 A1 | 12/2015 | Nishioka et al. | |
| 2016/0061255 A1 | 3/2016 | Nishioka et al. | |
| 2016/0069387 A1 | 3/2016 | Nishioka et al. | |

FOREIGN PATENT DOCUMENTS

| | | |
|---|---|---|
| JP | 63-96321 | 6/1988 |
| JP | 3-69813 | 3/1991 |
| JP | 2004-257510 | 9/2004 |
| JP | 2008-157330 | 7/2008 |
| JP | 2011-196544 | 10/2011 |
| JP | 2015-17692 | 1/2015 |

OTHER PUBLICATIONS

International Preliminary Report on Patentability and Written Opinion of the International Searching Authority dated Sep. 28, 2021 in International (PCT) Application No. PCT/JP2020/013255.
International Search Report dated Jun. 16, 2020 in International (PCT) Application No. PCT/JP2020/013255.

\* cited by examiner

| | BEARING SLEEVE INNER DIAMETER (mm) | φ1.5 | φ2 | φ3 | φ4 | |
|---|---|---|---|---|---|---|
| MINIMUM NUMBER (3) | A(mm) | 0.9151 | 0.9517 | 1.6015 | 2.2695 | |
| | B(mm) | 0.1383 | 0.1607 | 0.2512 | 0.3560 | |
| | C(mm) | 0.6731 | 0.7000 | 1.1778 | 1.6692 | MIN |
| | A/2B | 3.31 | 2.96 | 3.19 | 3.19 | 2.96 |
| | C/2B | 2.43 | 2.18 | 2.34 | 2.34 | 2.18 |
| MAXIMUM NUMBER (INNER DIAMETER×2+2) | BEARING SLEEVE INNER DIAMETER (mm) | φ1.5 | φ2 | φ3 | φ4 | |
| | A(mm) | 0.7354 | 0.9517 | 1.3843 | 2.2695 | |
| | B(mm) | 0.0893 | 0.1033 | 0.1225 | 0.1374 | |
| | C(mm) | 0.5409 | 0.7000 | 1.0182 | 1.6692 | MAX |
| | A/2B | 4.12 | 4.61 | 5.65 | 8.26 | 8.26 |
| | C/2B | 3.03 | 3.39 | 4.16 | 6.07 | 6.07 |

FIG. 10

| | BEARING SLEEVE INNER DIAMETER (mm) | φ1.5 | φ2 | φ3 | φ4 |
|---|---|---|---|---|---|
| MINIMUM NUMBER (3) | BEARING SLEEVE TOTAL LENGTH (mm) | 5 | 5.2 | 8.75 | 12.4 |
| | D(mm$^2$) | 23.550 | 32.656 | 82.425 | 155.744 |
| | E(mm$^2$) | 18.370 | 25.220 | 62.875 | 120.815 |
| | F(mm$^2$) | 1.4348 | 1.9644 | 4.7278 | 9.4947 |
| | E/D | 78% | 77% | 76% | 78% |
| | F/D | 6% | 6% | 6% | 6% |
| MAXIMUM NUMBER (INNER DIAMETER×2+2) | BEARING SLEEVE INNER DIAMETER (mm) | φ1.5 | φ2 | φ3 | φ4 |
| | BEARING SLEEVE TOTAL LENGTH (mm) | 4.71 | 6.28 | 9.42 | 12.56 |
| | D(mm$^2$) | 23.550 | 32.656 | 82.425 | 155.744 |
| | E(mm$^2$) | 18.106 | 24.958 | 62.700 | 118.473 |
| | F(mm$^2$) | 0.8465 | 0.9331 | 1.7965 | 2.6775 |
| | E/D | 77% | 76% | 76% | 76% |
| | F/D | 4% | 3% | 2% | 2% |

FLUID DYNAMIC BEARING DEVICE

TECHNICAL FIELD

The present invention relates to a fluid dynamic bearing device.

BACKGROUND ART

A fluid dynamic bearing device is configured to support a shaft member in a relatively rotatable and non-contact manner with pressure generated in a fluid film (for example, oil film) formed in a radial bearing gap defined between an outer peripheral surface of the shaft member and an inner peripheral surface of a bearing sleeve.

The fluid dynamic bearing device has high rotation accuracy and quietness, and is thus incorporated in and used for, for example, a spindle motor of a driving device for a magnetic disc such as an HDD, a polygon scanner motor of a laser beam printer (LBP), a color wheel motor of a projector, and a fan motor of an electric device.

For example, a fluid dynamic bearing device disclosed in Patent Literature 1 includes: a shaft member; a bearing sleeve having the shaft member inserted along an inner periphery; and a radial dynamic pressure generating portion configured to support the shaft member in a relatively rotatable and non-contact manner with pressure of an oil film generated in a radial bearing gap defined between an outer peripheral surface of the shaft member and an inner peripheral surface of a bearing sleeve.

Figure 16:
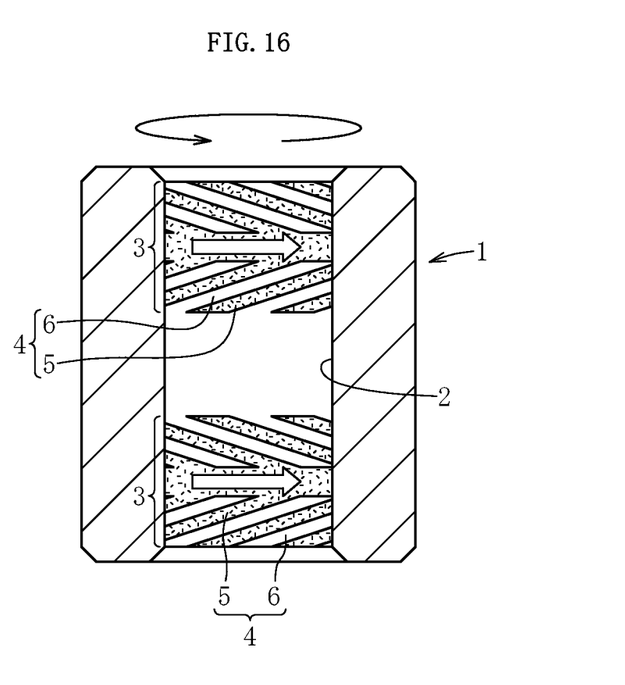
FIG. 16 is a sectional view for illustrating a related-art bearing sleeve of a fluid dynamic bearing device.

A bearing sleeve 1 forming the fluid dynamic bearing device of Patent Literature 1 is illustrated in FIG. 16. An inner peripheral surface 2 of the bearing sleeve 1 has, as illustrated in FIG. 16, radial bearing surfaces 3 formed at two locations apart from each other in an axial direction. The radial bearing surfaces 3 each have a radial dynamic pressure generating portion. The outlined arrows of FIG. 16 each indicate a flow of lubricating oil.

In the bearing sleeve 1 of Patent Literature 1, dynamic pressure generating grooves 4 having a herringbone pattern are formed as the radial dynamic pressure generating portion. The dynamic pressure generating grooves 4 each include hill portions 5 (region indicated by distributed dots in FIG. 16) and groove portions 6 each located between the hill portions 5. That is, the hill portions 5 have such a structure that protrudes radially inward from the groove portions 6.

CITATION LIST

Patent Literature: JP 2011-196544 A

SUMMARY OF INVENTION

Technical Problem

Incidentally, in the fluid dynamic bearing device as described in Patent Literature 1, a rotation direction of the shaft member (see the solid-line arrow of FIG. 16) is limited to one direction. Thus, at the time of incorporating the bearing sleeve 1, it is required that the bearing sleeve 1 be incorporated in a direction adapted to the rotation direction of the shaft member. As a result, the operation of incorporation is complicated, which may degrade the operability.

Moreover, the dynamic pressure generating grooves 4 formed in the inner peripheral surface 2 of the bearing sleeve 1 have the herringbone pattern. Thus, a bearing area (hill portions 5 of the dynamic pressure generating grooves 4) is small. As a result, surface pressure which acts on the radial bearing surfaces 3 of the bearing sleeve 1 is high, and wear resistance thereof is degraded.

Further, in a region with low rotation speed of the shaft member, it is difficult to obtain a sufficient dynamic pressure effect, and it is difficult to support the shaft member in a non-contact manner. As a result, there is a fear in that the shaft member comes into contact with the radial bearing surfaces 3 of the bearing sleeve 1.

The present invention has been made in view of the above-mentioned problems, and has an object to provide a fluid dynamic bearing device, which is adaptable regardless of whether a rotation direction of a shaft member is a forward direction or a reverse direction, is increased in bearing area, and is capable of obtaining a sufficient dynamic pressure effect even in a region with low rotation speed.

Solution to Problem

According to the present invention, there is provided a fluid dynamic bearing device, comprising: a shaft member; a bearing member having the shaft member inserted along an inner periphery of the bearing member; and a radial dynamic pressure generating portion configured to support the shaft member in a relatively rotatable and non-contact manner with pressure of a fluid film formed in a radial bearing gap defined between an outer peripheral surface of the shaft member and an inner peripheral surface of the bearing member.

As a technical measure for achieving the above-mentioned object, the radial dynamic pressure generating portion of the present invention comprises: the large number of polygonal hill portions arranged in a pattern on any one of the inner peripheral surface of the bearing member and the outer peripheral surface of the shaft member; and the same number of polygonal groove portions as the polygonal hill portions, each of the polygonal groove portions formed in such a manner as to surround the polygonal hill portions.

According to the present invention, as the radial dynamic pressure generating portion, the dynamic pressure generating grooves comprising the polygonal hill portions and the polygonal groove portions are formed. Accordingly, the fluid dynamic bearing device is adaptable regardless of whether the rotation direction of the shaft member is the forward direction or the reverse direction. Moreover, a bearing area of the bearing member (polygonal hill portions of the dynamic pressure generating grooves) can be increased. Further, a sufficient dynamic pressure effect can be obtained even in a region with low rotation speed of the shaft member.

In the radial dynamic pressure generating portion of the present invention, it is preferred that a surface opening ratio in the polygonal groove portions be larger than a surface opening ratio in the polygonal hill portions.

When such a structure is employed, it is effective in that the lubricating oil can be efficiently supplied to the radial bearing surface of the bearing member.

It is preferred that the radial dynamic pressure generating portion of the present invention comprise groove portions, which are formed at respective centers of the polygonal hill portions and are configured to supply lubricating oil.

When such a structure is employed, the lubricating oil is well supplied to the radial bearing surface of the bearing member. Thus, it is effective in that the lubrication efficiency can be improved.

It is preferred that the radial dynamic pressure generating portion of the present invention comprise hill portions configured to prevent outflow of lubricating oil from the polygonal groove portions.

When such a structure is employed, outflow of the lubricating oil from the polygonal groove portions can be prevented. Thus, it is effective in that the lubrication efficiency can be improved.

It is preferred that the radial dynamic pressure generating portion of the present invention comprise connection groove portions each configured to connect adjacent polygonal groove portions, and a sectional area of the connection groove portion be set to be larger than a sectional area of the polygonal groove portion.

When such a structure is employed, the amount of lubricating oil that flows through the connection groove portions becomes larger than the amount of lubricating oil that flows through the polygonal groove portions. Thus, the lubricating oil can be continuously supplied to the radial bearing gap.

It is preferred that the connection groove portions of the present invention comprise: a first connection groove portion configured to connect polygonal groove portions located on an upper side and a lower side in an axial direction; and a second connection groove portion configured to connect, in a circumferential direction, the polygonal groove portions, in which a sectional area of the first connection groove portion be set to be larger than a sectional area of the second connection groove portion.

When such a structure is employed, even when a gravity center position of the rotating shaft member deviates from a designed point, a dynamic pressure force that supports the shaft member becomes constant in a smoothened range. Thus, the robustness (durability) can be established.

Advantageous Effects of Invention

According to the present invention, as the radial dynamic pressure generating portion, the dynamic pressure generating grooves comprising the polygonal hill portions and the polygonal groove portions are formed. Accordingly, the fluid dynamic bearing device is adaptable regardless of whether the rotation direction of the shaft member is the forward direction or the reverse direction. Thus, the operation of incorporating the bearing member is simplified, thereby being capable of improving the operability.

Moreover, the bearing area of the bearing member (polygonal hill portions of the dynamic pressure generating grooves) can be increased. Thus, the surface pressure that acts on the radial bearing surface of the bearing member becomes smaller, thereby being capable of improving the wear resistance.

Further, a sufficient dynamic pressure effect can be obtained even in the region with low rotation speed of the shaft member. Thus, the shaft member can be reliably supported in a non-contact manner, thereby being capable of suppressing contact of the shaft member with the radial bearing surface of the bearing member.

DESCRIPTION OF EMBODIMENTS

An embodiment of a fluid dynamic bearing device according to the present invention is described below in detail with reference to the drawings. Before the description of the fluid dynamic bearing device, the description is made of a fan motor into which the fluid dynamic bearing device is to be incorporated.

Figure 1:
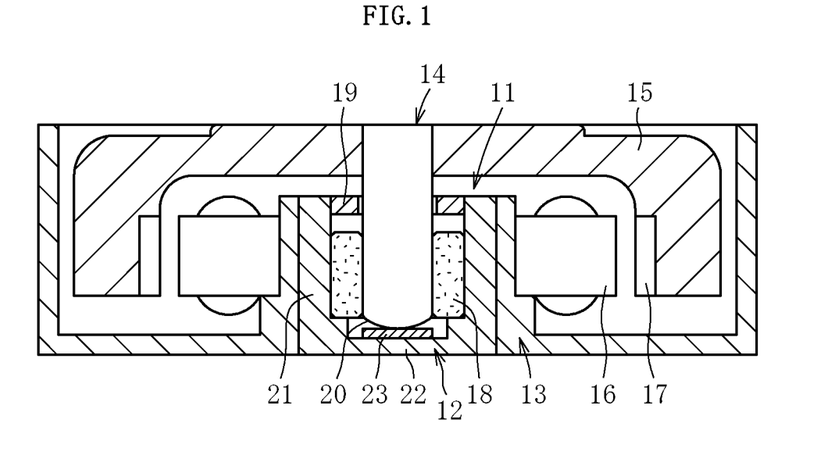
FIG. 1 is a sectional view for illustrating a schematic configuration of a fan motor.

FIG. 1 shows a schematic configuration of a fan motor for cooling, which is to be incorporated into information equipment, for example, mobile equipment such as a mobile phone or a tablet terminal.

As illustrated in FIG. 1, the fan motor mainly comprises a fluid dynamic bearing device 11 according to the embodiment, a motor base 13 to which a housing 12 of the fluid dynamic bearing device 11 is fixed, and a rotor 15 to which a shaft member 14 of the fluid dynamic bearing device 11 is fixed.

A stator coil 16 is mounted to the motor base 13. Moreover, rotor magnets 17 are mounted to the rotor 15 in such a manner as to be opposed to the stator coil 16 across a radial gap.

When the stator coil 16 is energized, an electromagnetic force generated between the stator coil 16 and the rotor magnets 17 causes the rotor 15 and the shaft member 14 to integrally rotate, and vanes (not shown) provided to the rotor 15 generate an airflow in the axial direction or in the radial direction.

Next, the fluid dynamic bearing device 11 incorporated in the above-mentioned fan motor, that is, the fluid dynamic bearing device 11 according to this embodiment is described below in detail.

Figure 2:
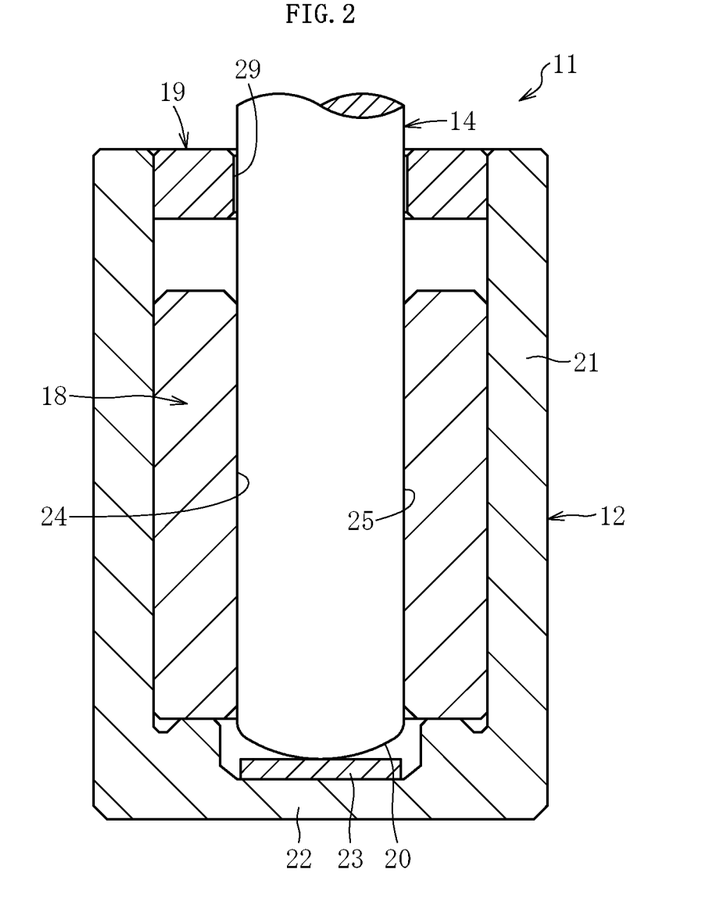
FIG. 2 is a sectional view for illustrating a fluid dynamic bearing device to be incorporated into the fan motor.

As illustrated in FIG. 2, the fluid dynamic bearing device 11 according to the embodiment comprises the shaft member 14, a bearing sleeve 18 being a bearing member, the housing 12 having a bottomed tubular shape, and a sealing member 19. An internal space of the housing 12 is filled with a predetermined amount of lubricating oil (not shown).

The rotor 15 is mounted to the shaft member 14 (see FIG. 1). The shaft member 14 is inserted along an inner periphery of the bearing sleeve 18. The housing 12 has an opening portion at an end portion in the axial direction and holds the bearing sleeve 18 along an inner periphery. The sealing member 19 is mounted at the end portion of the housing 12 in the axial direction and closes the opening portion of the housing 12.

The shaft member 14 is made of, for example, metal such as stainless steel and has a columnar shape. An outer diameter of the shaft member 14 is set to be smaller than inner diameters of the bearing sleeve 18 and the sealing member 19. A protruding portion 20 is formed at a lower end of the shaft member 14. The rotor 15 is fixed at an upper end of the shaft member 14 (see FIG. 1).

The housing 12 is a member integrally comprising a cylindrical side portion 21 and a bottom portion 22 and being made of metal or resin. A receiving member 23 made of resin is arranged on the bottom portion 22 of the housing 12. An upper surface of the receiving member 23 functions as a thrust bearing surface configured to support the protruding portion 20 of the shaft member 14 in a contact manner. The receiving member 23 may be omitted. In such a case, a bottom surface of the housing 12 functions as the thrust bearing surface.

The bearing sleeve 18 has a cylindrical shape, and is fixed to an inner peripheral surface of the side portion 21 of the housing 12 by appropriate means such as press-fitting. The bearing sleeve 18 is a porous body made of, for example, copper/iron-based sintered metal containing copper and iron as main components. Internal pores of the bearing sleeve 18 are impregnated with lubricating oil. A material of the bearing sleeve 18 may be other than sintered metal, and may be, for example, a porous body made of soft metal such as brass, or resin.

A radial dynamic pressure generating portion is formed on an inner peripheral surface 24 of the bearing sleeve 18 serving as a radial bearing surface. The radial dynamic pressure generating portion is configured to support the shaft member 14 in a relatively rotatable and non-contact manner with pressure of a fluid film (oil film) formed between an outer peripheral surface 25 of the shaft member 14 and the inner peripheral surface 24 of the bearing sleeve 18.

Figure 3:
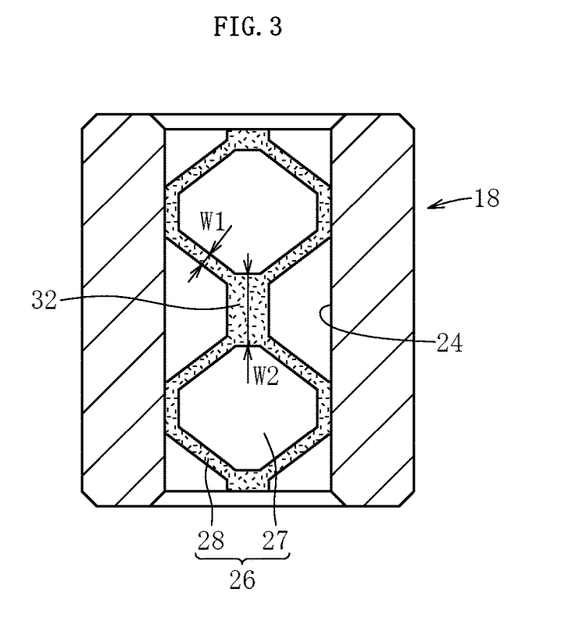
FIG. 3 is a sectional view for illustrating one example of a bearing sleeve of the fluid dynamic bearing device.

In this embodiment, as the radial dynamic pressure generating portion, as illustrated in FIG. 3, dynamic pressure generating grooves 26 having a polygonal shape, for example, an octagonal shape are formed. Here, the dynamic pressure generating grooves 26 having the octagonal shape are illustrated. However, any dynamic pressure generating groove having a polygonal shape other than the octagonal shape may be provided.

The dynamic pressure generating grooves 26 comprise the large number of octagonal hill portions 27 and octagonal groove portions 28. The octagonal hill portions 27 are arranged in a pattern on the inner peripheral surface 24 of the bearing sleeve 18. The octagonal groove portions 28 are formed in such a manner as to surround the octagonal hill portions 27. The octagonal hill portions 27 have such a structure as to protrude radially inward from the octagonal groove portions 28 (region indicated by distributed dots in FIG. 3).

The respective numbers and sizes of the octagonal hill portions 27 and the octagonal groove portions 28 illustrated in FIG. 3 are illustrative examples, and may suitably be set in view of forming an oil film in the radial bearing gap defined between the outer peripheral surface 25 of the shaft member 14 and the inner peripheral surface 24 of the bearing sleeve 18.

The dynamic pressure generating grooves 26 have a shape that is symmetrical over the axial center of the bearing sleeve 18. With the large number of octagonal hill portions 27 and octagonal groove portions 28 being arranged in a pattern on the inner peripheral surface 24 of the bearing sleeve 18, the octagonal groove portions 28 are partially arranged such that the grooves inclined with respect to the rotation direction of the shaft member 14 are arranged in right-left symmetry over the axial center.

The sealing member 19 is an annular member made of, for example, soft metal such as brass, other metal, or resin. The sealing member 19 is fixed to an upper end portion of the housing 12 in a state of being separated apart from an upper end surface of the bearing sleeve 18 (see FIG. 2).

As illustrated in FIG. 2, an inner peripheral surface 29 of the sealing member 19 comes close to the outer peripheral surface 25 of the shaft member 14 to form a non-contact seal (labyrinth seal). The shape and configuration of the sealing member 19 may be other than those illustrated in FIG. 2 and may be suitably selected.

In the fluid dynamic bearing device 11 described above, when the shaft member 14 rotates, a radial bearing gap is defined between the inner peripheral surface 24 of the bearing sleeve 18 and the outer peripheral surface 25 of the shaft member 14. The dynamic pressure generating grooves 26 of the bearing sleeve 18 cause the lubricating oil provided in the radial bearing gap to generate a dynamic pressure action.

During high-speed rotation of the shaft member 14, an oil film that is increased in pressure by the dynamic pressure action of the dynamic pressure generating grooves 26 is formed between the radial bearing gap defined between the inner peripheral surface 24 of the bearing sleeve 18 and the outer peripheral surface 25 of the shaft member 14. This oil film forms a radial bearing portion configured to support the shaft member 14 in a non-contact manner. A thrust load borne on the shaft member 14 is supported in a contact manner on the upper surface of the receiving member 23 being a thrust bearing portion.

That is, the lubricating oil provided in the radial bearing gap is collected to the octagonal hill portions 27 side along the octagonal groove portions 28 of the dynamic pressure generating grooves 26, and the pressure is maximized between the octagonal hill portions 27 and the outer peripheral surface 25 of the shaft member 14. In such a manner, the radial bearing portion configured to support the shaft member 14 in a non-contact manner is formed. Through sliding of the protruding portion 20 of the shaft member 14 and the receiving member 23, the thrust bearing portion configured to support the shaft member 14 in a contact manner is formed.

Here, the fluid dynamic bearing device 11 is roughly classified into a dynamic bearing and a cylindrical bearing. The dynamic bearing has, on the inner peripheral surface 24 of the bearing sleeve 18, the dynamic pressure generating grooves 26 configured to actively generate dynamic pressure in the oil film provided in the radial bearing gap. The cylindrical bearing has a cylindrical surface on the inner peripheral surface 24 of the bearing sleeve 18 and is configured to generate dynamic pressure through whirling of the shaft member 14.

In a fan motor comprising the fluid dynamic bearing device 11, during use in a steady posture, a pressure increasing effect achieved by the dynamic pressure generating grooves 26 being the dynamic bearing causes the shaft member 14 as well as the rotor 15 and vanes to rotate with high rotation accuracy. Thus, for example, generation of noise due to contact between the shaft member 14 and the bearing sleeve 18 is less liable to occur.

Further, even when the fan motor is used in a non-steady state (for example, in a state of swinging by whirling of the shaft member 14), and the shaft member 14 is significantly eccentric with respect to the bearing sleeve 18, the ratio of the octagonal hill portions 27 with respect to the octagonal groove portions 28 of the dynamic pressure generating grooves 26 is large so that a supporting ability close to that of the cylindrical bearing can be achieved.

In the fluid dynamic bearing device 11 according to the embodiment described above, the dynamic pressure generating grooves 26 comprising the octagonal hill portions 27 and the octagonal groove portions 28 are formed as the radial dynamic pressure generating portion. Thus, as illustrated in FIG. 4A and FIG. 4B, the fluid dynamic bearing device 11 is adaptable regardless of whether the rotation direction of the shaft member 14 is a forward direction or a reverse direction (see the solid line arrows of FIG. 4A and FIG. 4B).

Figure 4A:
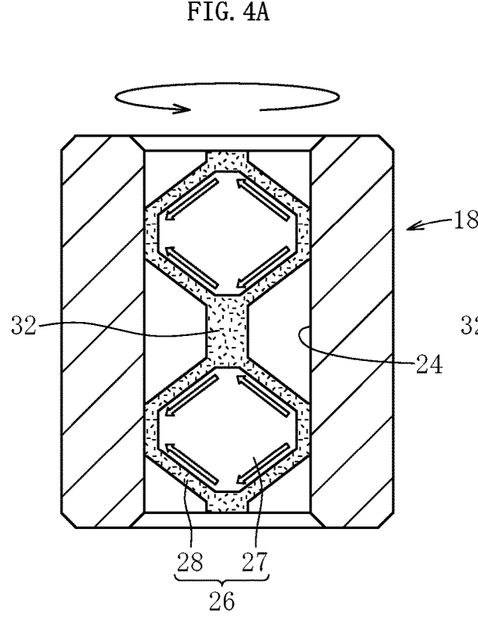
FIG. 4A is a sectional view for illustrating a flow of lubricating oil on the bearing sleeve of FIG. 3 at the time of forward rotation.
Figure 4B:
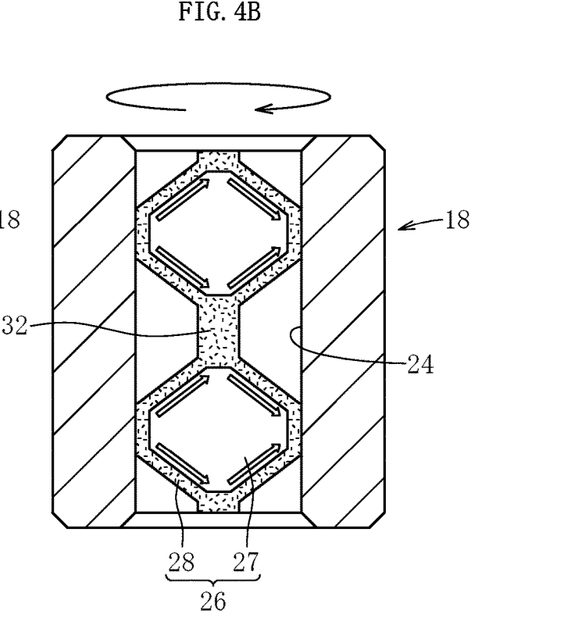
FIG. 4B is a sectional view for illustrating a flow of lubricating oil on the bearing sleeve of FIG. 3 at the time of reverse rotation.

That is, when the rotation direction of the shaft member 14 is the forward direction, the lubricating oil flows in the direction indicated by the outlined arrows of FIG. 4A. Moreover, when the rotation direction of the shaft member 14 is the reverse direction, the lubricating oil flows in the direction indicated by the outlined arrows of FIG. 4B.

Accordingly, at the time of incorporating the bearing sleeve 18, there is no constraint related to the rotation direction of the shaft member 14, and hence the bearing sleeve 18 can be incorporated without limitation on the direction of incorporating the bearing sleeve 18. Moreover, the fluid dynamic bearing device 11 is usable also in application that involves changes in the rotation direction of the shaft member 14. As a result, the operation of incorporating the bearing sleeve 18 is simplified, thereby being capable of improving the operability.

Moreover, the bearing area of the bearing sleeve 18 (octagonal hill portions 27 of the dynamic pressure generating grooves 26) can be increased. Thus, the surface pressure that acts on the radial bearing surface of the bearing sleeve 18 becomes smaller, thereby being capable of improving the wear resistance. As a result, a longer service life of the fluid dynamic bearing device 11 can be achieved.

Further, even in a region with low rotation speed of the shaft member 14, a sufficient dynamic pressure effect can be obtained. In particular, during stop of activation and low-speed rotation, the octagonal groove portions 28 function as an oil reservoir. Accordingly, the shaft member 14 can be reliably supported in a non-contact manner, thereby being capable of suppressing contact of the shaft member 14 with the radial bearing surface of the bearing sleeve 18.

The bearing sleeve 18 of this embodiment is a porous body, and a surface opening ratio (i.e., a porosity of a surface) in the octagonal hill portions 27 is set to be equal to or smaller than 20%, preferably from 2% to 10%. Further, a surface opening ratio (i.e., a porosity of a surface) in the octagonal groove portions 28 is set to be larger than the surface opening ratio (i.e., a porosity of a surface) in the octagonal hill portions 27.

When such a structure is employed, the lubricating oil can be efficiently supplied to the radial bearing surface of the bearing sleeve 18.

Figure 5:
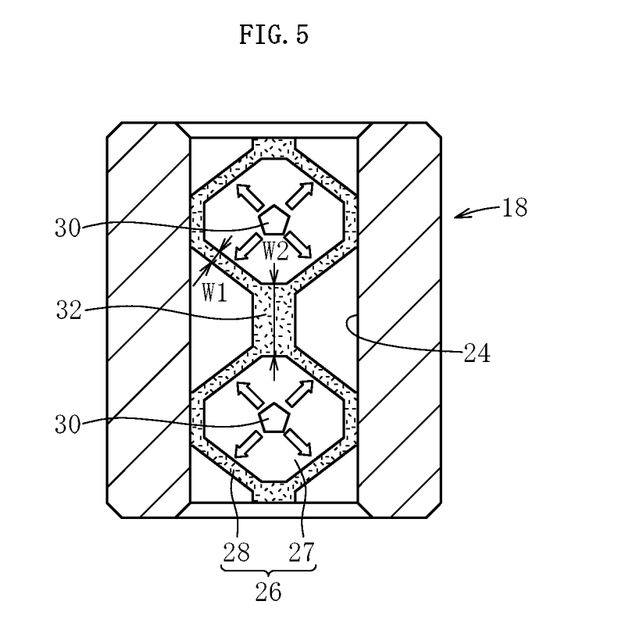
FIG. 5 is a sectional view for illustrating another example of the bearing sleeve.

In the inner peripheral surface 24 of the bearing sleeve 18, as illustrated in FIG. 5, groove portions 30 (pockets) for supplying the lubricating oil may be formed at respective centers of the octagonal hill portions 27. The outlined arrows of FIG. 5 indicate a flow of the lubricating oil from the groove portions 30.

When such a structure is employed, as indicated by the outlined arrows of FIG. 5, the lubricating oil is well supplied to the radial bearing surface of the bearing sleeve 18, thereby being capable of improving lubrication efficiency.

Figure 6:
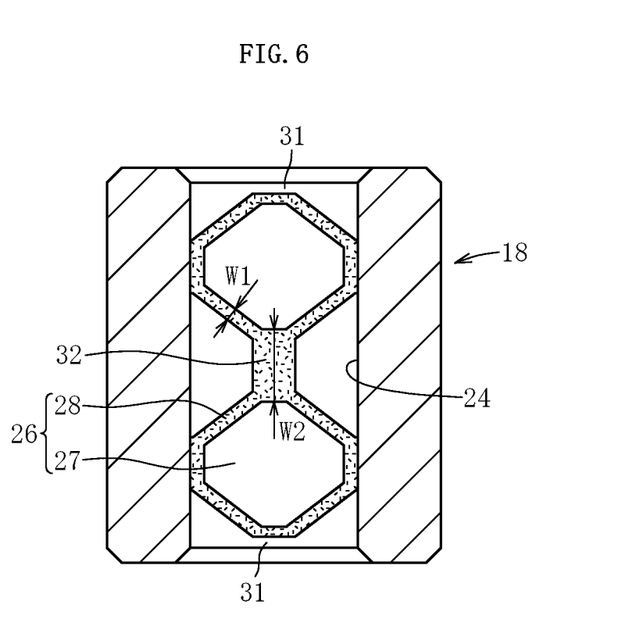
FIG. 6 is a sectional view for illustrating another example of the bearing sleeve.

In the inner peripheral surface 24 of the bearing sleeve 18, as illustrated in FIG. 6, at both ends of the inner peripheral surface 24 of the bearing sleeve 18 in the axial direction, there may be formed hill portions 31 configured to prevent outflow of the lubricating oil from the octagonal groove portions 28.

When such a structure is employed, outflow of the lubricating oil from the octagonal groove portions 28 to the outside of the bearing sleeve 18 can be prevented, thereby being capable of improving the lubrication efficiency.

In the inner peripheral surface 24 of the bearing sleeve 18 of the embodiment illustrated in FIG. 3, FIG. 5, and FIG. 6, connection groove portions 32 each connecting adjacent octagonal groove portions 28 are formed. In the dynamic pressure generating grooves 26, a sectional area of the connection groove portion 32 is set to be larger than a sectional area of the octagonal groove portion 28. As a precondition, the sectional area of the connection groove portion 32 is set to be larger by two times than the sectional area of the octagonal groove portion 28.

Figure 9:
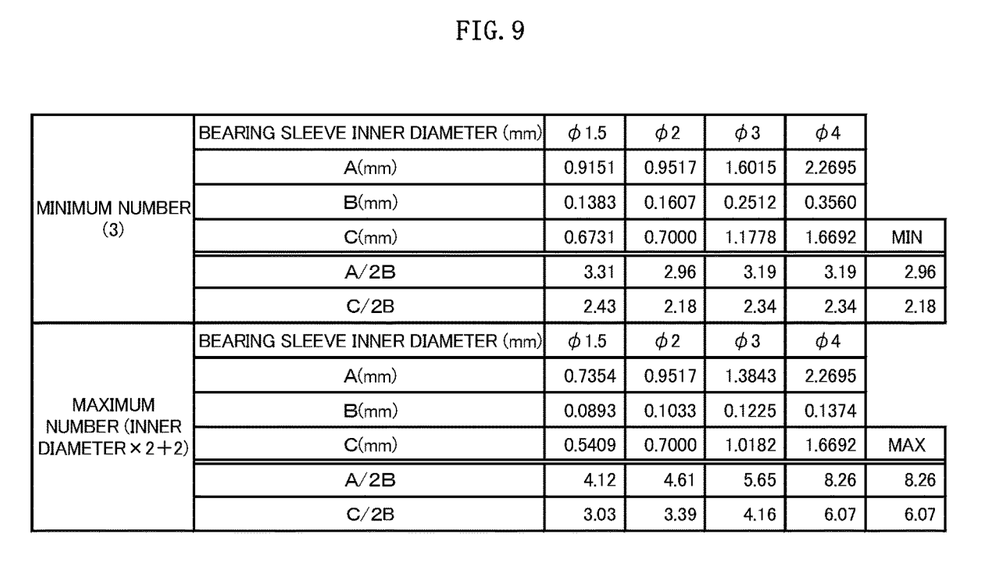
FIG. 9 is a table for showing sectional areas of connection groove portions.

For example, illustration is given of the mode of FIG. 9 with three grooves and an inner diameter of $\varphi 2$. When a depth of the octagonal groove portion 28 is 0.003 mm, and a width W1 thereof is 0.1607 mm, a sectional area of the octagonal groove portion 28 is 0.003 mm×0.1607 mm=0.0004821 mm$^2$. In contrast, when a depth of the connection groove portion 32 is 0.003 mm, and a width W2 thereof is 0.9517 mm, a sectional area of the connection groove portion 32 is 0.003 mm×0.9517 mm=0.0028551 mm$^2$.

Here, when the sectional area of the connection groove portion 32 is excessively large, the dynamic pressure is reduced. Thus, it is preferred that the sectional area of the connection groove portion 32 be equal to or smaller than 0.0028551 mm$^2$. Accordingly, it is preferred that the sectional area of the connection groove portion 32 be set after determining the sectional area of the octagonal groove portion 28. Further, it is preferred that the depths of the octagonal groove portion 28 and the connection groove portion 32 be the same dimension as that of the radial bearing gap.

As described above, when the sectional area of the connection groove portion 32 is set to be larger than the sectional area of the octagonal groove portion 28, the amount of lubricating oil that flows through the connection groove portions 32 becomes larger than the amount of lubricating oil that flows through the octagonal groove portions 28, thereby being capable of continuously supplying the lubricating oil to the radial bearing gap. As a result, in the dynamic pressure generating grooves 26, the dynamic pressure action can be effectively generated in the lubricating oil provided in the radial bearing gap.

When the sectional area of the connection groove portion 32 is smaller than the sectional area of the octagonal groove portion 28, the amount of lubricating oil that flows through the connection groove portions 32 becomes smaller than the amount of lubricating oil that flows through the octagonal groove portions 28. Thus, negative pressure is generated near inlets of the octagonal groove portions 28, with the result that it becomes more difficult to obtain a sufficient dynamic pressure effect.

Figure 7:
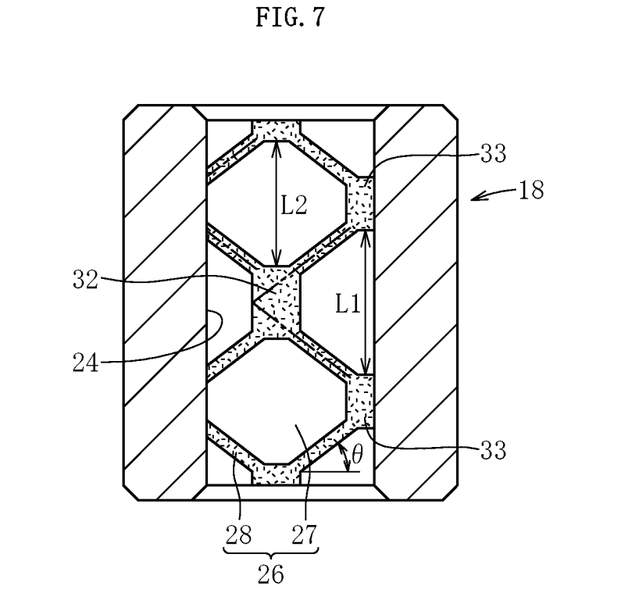
FIG. 7 is a sectional view for illustrating another example of the bearing sleeve.

As illustrated in FIG. 7, the connection groove portions 32 described above (hereinafter referred to as "first connection groove portion") each connect two adjacent octagonal groove portions 28 which are located on an upper side and a lower side in the axial direction of the bearing sleeve 18. Further, there are formed connection groove portions 33 (hereinafter referred to as "second connection groove portion") each connect, in the circumferential direction, the octagonal groove portions 28 which are located on the upper side and the lower side.

The first connection groove portions 32 have an oil reservoir function for suppressing shortage of lubricating oil in the octagonal groove portions 28 and the second connection groove portions 33. The octagonal groove portions 28 have a function of generating the dynamic pressure action and suppressing a reverse flow caused by the pressure generated in the second connection groove portions 33.

The second connection groove portions 33 have a function of smoothening a pressure peak of the dynamic pressure to suppress eccentricity caused by deviation of a gravity center position of the shaft member 14. Specifically, even when the gravity center position of the shaft member 14 deviates from a designed point, a dynamic pressure force that supports the shaft member 14 becomes constant in a smoothened range. Thus, the robustness (durability) can be established.

Here, it is preferred that the sectional area of the first connection groove portion 32 be large in view of storing the lubricating oil. However, when the sectional area of the first connection groove portion 32 is set to be excessively large, a flow path length of the octagonal groove portions 28 becomes shorter, with the result that it becomes more difficult to maximally generate the dynamic pressure.

Figure 8:
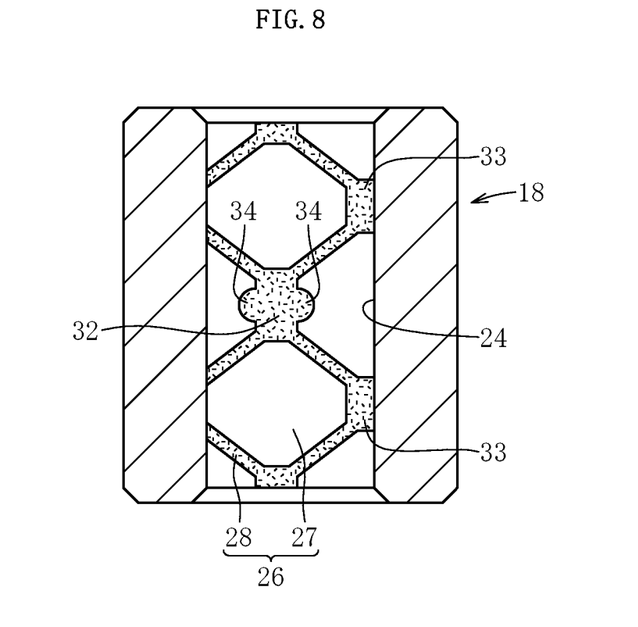
FIG. 8 is a sectional view for illustrating another example of the bearing sleeve.

As the structure for increasing the sectional area of the first connection groove portion 32 without shortening the flow path length of the octagonal groove portions 28, the axial length of the first connection groove portions 32 cannot be changed, and hence it is effective to form, as illustrated in FIG. 8, recess portions 34 which expands the first connection groove portion 32 in the circumferential direction.

Meanwhile, although generation of the dynamic pressure can be increased by increasing the flow path length of the octagonal groove portions 28, when the flow path length of the octagonal groove portions 28 is excessively increased, the sectional areas of the first connection groove portion 32 and the second connection groove portion 33 are reduced, with the result that the functions of the first connection groove portions 32 and the second connection groove portion 33 are degraded.

Further, the second connection groove portions 33 smoothen the pressure peak of the dynamic pressure to suppress the eccentricity caused by deviation of the gravity center position of the shaft member 14, and hence it is preferred that the second connection groove portions 33 have a large sectional area. However, when the sectional area of the second connection groove portion 33 is excessively increased, similarly to the first connection groove portions 32, the flow path length of the octagonal groove portions 28 is shortened, with the result that it becomes more difficult to maximally generate the dynamic pressure.

In view of this, the sectional areas of the first connection groove portion 32, the octagonal groove portion 28, and the second connection groove portion 33 are defined as follows. When there are given a sectional area A of the first connection groove portion 32, a sectional area B of the octagonal groove portion 28, and a sectional area C of the second connection groove portion 33, a relationship of $A > C \geq 2B$ is defined (see FIG. 9).

The depths of the first connection groove portion 32, the octagonal groove portion 28, and the second connection groove portion 33 are the same. Thus, in FIG. 9, the respective sectional areas of the first connection groove portion 32, the octagonal groove portion 28, and the second connection groove portion 33 are expressed by sectional widths. With regard to "number" given in FIG. 9, two octagonal hill portions 27 located on the upper side and the lower side in the axial direction of the bearing sleeve 18 are regarded as one, and the number corresponds to the number arranged in the circumferential direction of the bearing sleeve 18.

As shown in FIG. 9, it is preferred that a sectional area ratio A/2B of the first connection groove portion 32 to the octagonal groove portion 28 be equal to or larger than 2.96 and equal to or smaller than 8.26. When the sectional area ratio is smaller than 2.96, shortage of the lubricating oil in the octagonal groove portions 28 and the second connection groove portions 33 occurs, with the result that the dynamic pressure is reduced. Further, when the sectional area ratio is larger than 8.26, it becomes more difficult to secure the flow path length of the octagonal groove portions 28, with the result that the dynamic pressure is reduced.

Further, it is preferred that a sectional area ratio C/2B of the second connection groove portion 33 to the octagonal groove portion 28 be equal to or larger than 2.18 and equal to or smaller than 6.07. When the sectional area ratio is smaller than 2.18, it becomes more difficult to smoothen the maximum peak of the dynamic pressure with the second connection groove portions 33, with the result that it becomes more difficult to suppress the eccentricity caused by the deviation of the gravity center of the shaft member 14. Further, when the sectional area ratio is larger than 6.07, it becomes more difficult to secure the flow path length of the octagonal groove portions 28, with the result that the dynamic pressure is reduced. Moreover, it becomes more difficult to suppress the reverse flow of the lubricating oil to the first connection groove portions 32, with the result that torque becomes higher.

In this fluid dynamic bearing device 11, through formation of the dynamic pressure generating grooves 26 comprising the octagonal hill portions 27 and the octagonal groove portions 28 as the radial dynamic pressure generating portion, the bearing area of the bearing sleeve 18, that is, a hill-portion sum total surface area is increased so that a supporting ability close to that of a cylindrical bearing can be achieved. Moreover, when the surface area of the octagonal hill portions 27 of the dynamic pressure generating grooves 26 is increased, a sufficient dynamic pressure effect can be obtained even in the region with low rotation speed of the shaft member 14, thereby being capable of achieving a supporting ability close to that of the cylindrical bearing. Further, with regard to the dynamic pressure effect obtained with the octagonal groove portions 28, when the gap defined between the shaft member 14 and the bearing sleeve 18 has eccentricity or inclination on the circumference, the dynamic pressure becomes higher when the gap defined between the shaft member 14 and the bearing sleeve 18 is small than when the gap defined between the shaft member 14 and the bearing sleeve 18 is large, thereby suppressing the eccentricity of the shaft member 14.

Figure 10:
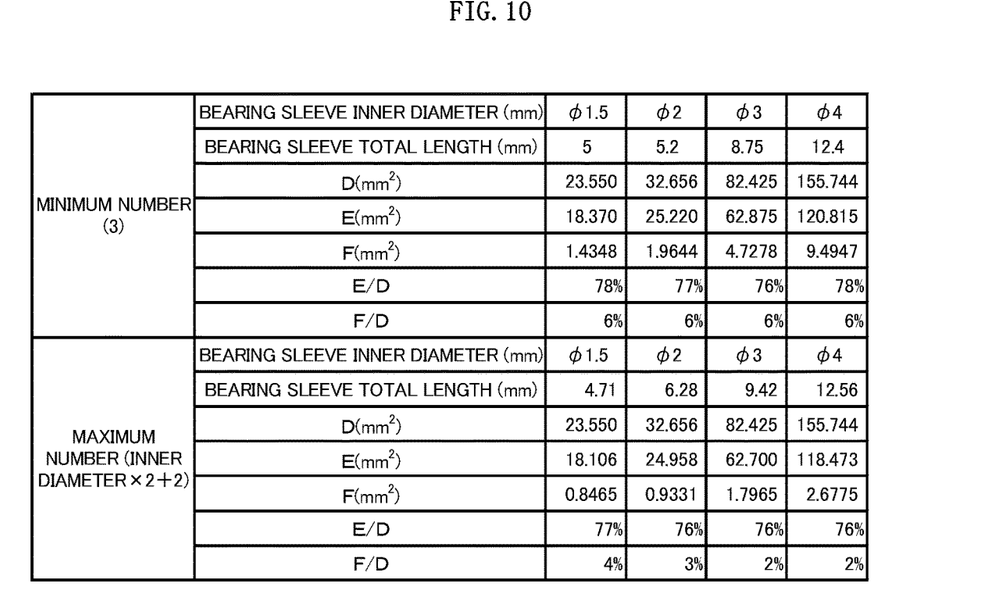
FIG. 10 is a table for showing surface areas of hill portions of dynamic pressure generating grooves.

As shown in FIG. 10, when a total surface area of the inner peripheral surface 24 of the bearing sleeve 18 is represented by D, and a sum total of the surface area of the hill portions (hill-portion sum total surface area) occupying the total surface area D is represented by E, a ratio E/D of the hill-portion sum total surface area E to the total surface area D is set to be from 76% to 78%. In view of this, it is preferred that the hill-portion sum total surface area E of the dynamic pressure generating grooves 26 be increased.

Although it changes depending on the number of groove portions along the axial direction in the inner peripheral surface 24 of the bearing sleeve 18, when a surface area of each octagonal hill portion 27 is represented by F, a surface area ratio F/D of each octagonal hill portion 27 to the bearing sleeve 18 is set to be from 2% to 6%.

When the surface area ratio F/D is smaller than 2%, a dynamic pressure generating force of each octagonal hill portion 27 is reduced. When the surface area ratio F/D is larger than 6%, the dimensions of the first connection groove portions 32 and the second connection groove portions 33 become smaller, with the result that the dynamic pressure is reduced.

Further, in this embodiment, it is only required that an angle of the octagonal groove portion 28 with respect to the circumferential direction of the bearing sleeve 18 be from about 15° to about 45°. An angle θ of the octagonal groove portion 28 shown in FIG. 10 is 40° (see FIG. 7).

In this embodiment, as illustrated in FIG. 7, an axial dimension L1 of the octagonal hill portion 27 located at the center in the axial direction is set to be longer than an axial dimension L2 of each of the octagonal hill portions 27 located on the upper side and the lower side in the axial direction (L1>L2).

With such a configuration, a center line of the octagonal groove portion 28 in which the lubricating oil flows to the first connection groove portion 32 and the second connection groove portion 33 and a center line of the octagonal groove portion 28 in which the lubricating oil flows out from the first connection groove portion 32 and the second connection groove portion 33 are not on the same line, and when the center lines are extended, both the center lines do not intersect until the center lines come into contact with the octagonal hill portion 27 located at the center in the axial direction (see the one-dot chain lines of FIG. 7).

With such a structure, stagnation of the lubricating oil in the first connection groove portions 32 and the second connection groove portions 33 is prevented so that release of the dynamic pressure can be prevented, thereby being capable of stabilizing the pressure in the octagonal groove portions 28.

In the embodiment described above, illustration is given of the case in which the dynamic pressure generating grooves 26 are formed in the inner peripheral surface 24 of the bearing sleeve 18. However, as illustrated in FIG. 11 to FIG. 15, the inner peripheral surface 24 of the bearing sleeve 18 may be formed as a smooth cylindrical surface, and the dynamic pressure generating grooves 26 may be formed in the outer peripheral surface 25 of the opposing shaft member 14.

Figure 11:
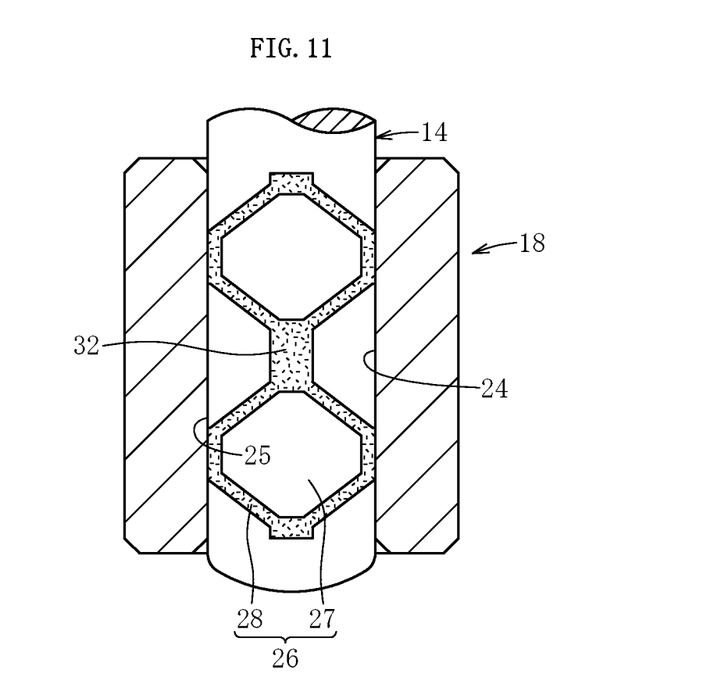
FIG. 11 is a sectional view for illustrating one example of a shaft member.
Figure 12:
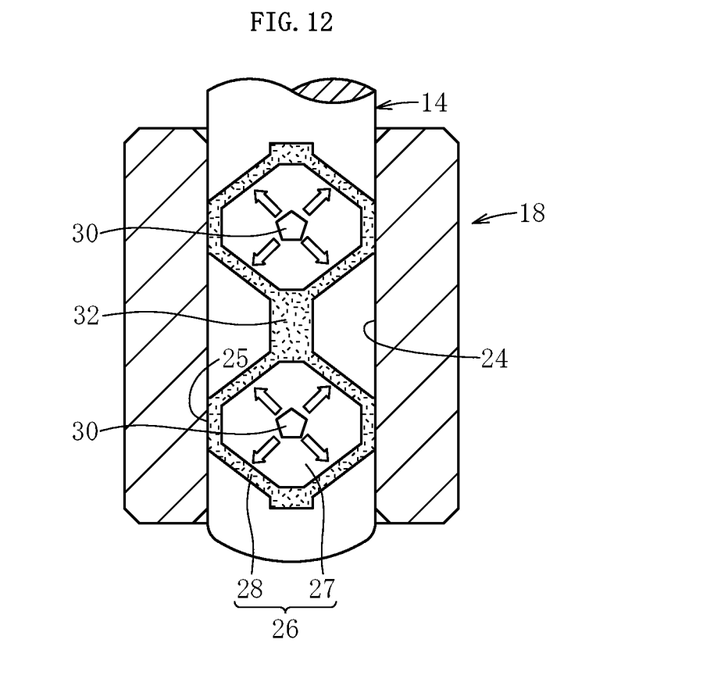
FIG. 12 is a sectional view for illustrating another example of the shaft member.
Figure 13:
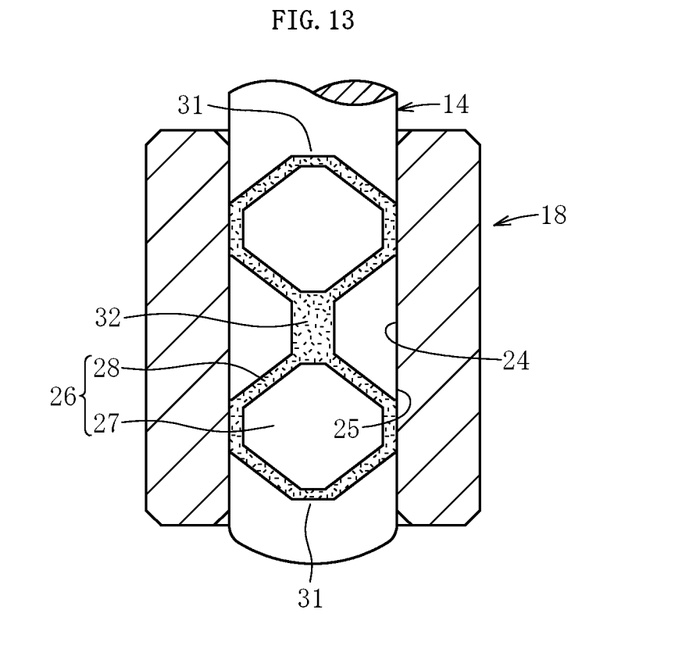
FIG. 13 is a sectional view for illustrating another example of the shaft member.
Figure 14:
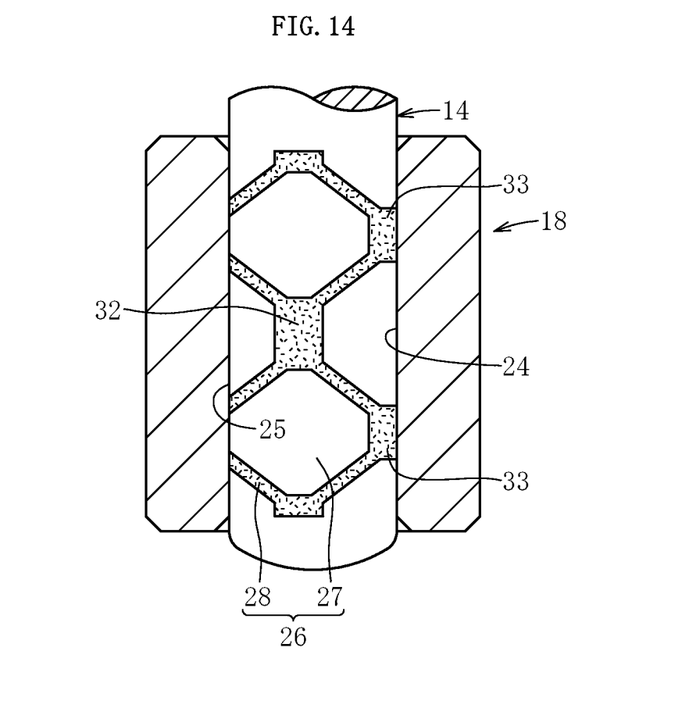
FIG. 14 is a sectional view for illustrating another example of the shaft member.
Figure 15:
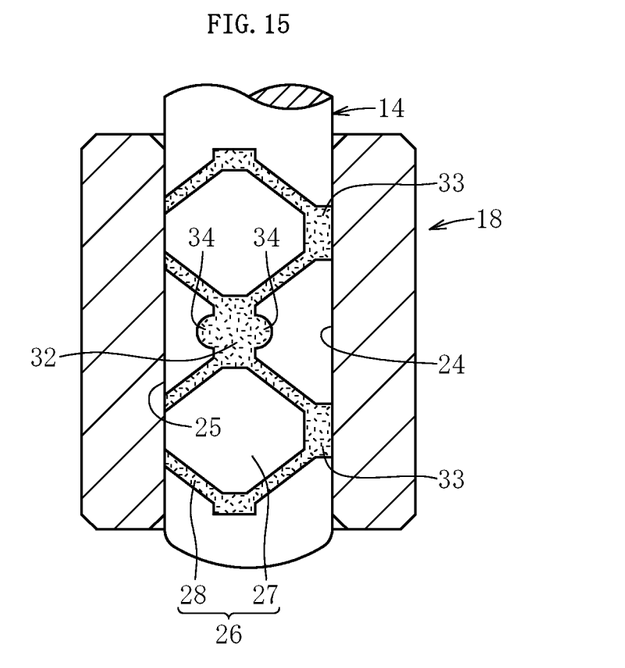
FIG. 15 is a sectional view for illustrating another example of the shaft member.

The embodiment illustrated in FIG. 11 corresponds to the embodiment illustrated in FIG. 3. The embodiment illustrated in FIG. 12 corresponds to the embodiment illustrated in FIG. 5. The embodiment illustrated in FIG. 13 corresponds to the embodiment illustrated in FIG. 6. The embodiment illustrated in FIG. 14 corresponds to the embodiment illustrated in FIG. 7. The embodiment illustrated in FIG. 15 corresponds to the embodiment illustrated in FIG. 8.

In the embodiment described above, illustration is given of the case in which the receiving member 23 of the thrust bearing portion supports the protruding portion 20 of the shaft member 14 in a contact manner (see FIG. 2). However, the thrust bearing portion, similarly to the radial bearing portion of the embodiment, may support the shaft member 14 in a non-contact manner with the pressure of the oil film.

Moreover, in the embodiment, illustration is given of the fluid dynamic bearing device 11 of a so-called shaft rotating type in which the bearing sleeve 18 is fixed and the shaft member 14 is rotated. However, the present invention is not limited to such a configuration, and may be applied also to a fluid dynamic bearing device of a so-called shaft fixing type in which the shaft member 14 is fixed and the bearing sleeve 18 is rotated.

The present invention is not limited to the above-mentioned embodiment. As a matter of course, the present invention may be carried out in various modes without departing from the spirit of the present invention. The scope of the present invention is defined in claims, and encompasses equivalents described in claims and all changes within the scope of claims.

The invention claimed is:

1. A fluid dynamic bearing device, comprising:
    a shaft member;
    a bearing member having the shaft member inserted along an inner periphery of the bearing member; and
    a radial dynamic pressure generating portion configured to support the shaft member in a relatively rotatable and non-contact manner with pressure of a fluid film formed in a radial bearing gap defined between an outer peripheral surface of the shaft member and an inner peripheral surface of the bearing member,
    wherein the radial dynamic pressure generating portion comprises:
        a plurality of polygonal hill portions pattern-arranged on any one of the inner peripheral surface of the bearing member and the outer peripheral surface of the shaft member;
        a same number of polygonal groove portions as the polygonal hill portions, each of the polygonal groove portions formed in such a manner as to surround the polygonal hill portions; and
        connection groove portions each configured to connect adjacent polygonal groove portions, and
    wherein a sectional area of one of the connection groove portions is set to be larger than a sectional area of one of the polygonal groove portions.

2. The fluid dynamic bearing device according to claim 1, wherein, in the radial dynamic pressure generating portion, a porosity of a surface in the polygonal groove portions is larger than a porosity of a surface in the polygonal hill portions.

3. The fluid dynamic bearing device according to claim 2, wherein the radial dynamic pressure generating portion further comprises hill portions configured to prevent outflow of lubricating oil from the polygonal groove portions.

4. The fluid dynamic bearing device according to claim 3, wherein the connection groove portions comprise:
    a first connection groove portion configured to connect polygonal groove portions located on an upper side and a lower side in an axial direction; and
    a second connection groove portion configured to connect, in a circumferential direction, polygonal groove portions, and
    wherein a sectional area of the first connection groove portion is set to be larger than a sectional area of the second connection groove portion.

5. The fluid dynamic bearing device according to claim 2, wherein the connection groove portions comprise:
   a first connection groove portion configured to connect polygonal groove portions located on an upper side and a lower side in an axial direction; and
   a second connection groove portion configured to connect, in a circumferential direction, polygonal groove portions, and
wherein a sectional area of the first connection groove portion is set to be larger than a sectional area of the second connection groove portion.

6. The fluid dynamic bearing device according to claim 2, wherein the radial dynamic pressure generating portion further comprises groove portions, which are formed at respective centers of the polygonal hill portions, and are configured to supply lubricating oil.

7. The fluid dynamic bearing device according to claim 1, wherein the radial dynamic pressure generating portion further comprises groove portions, which are formed at respective centers of the polygonal hill portions, and are configured to supply lubricating oil.

8. The fluid dynamic bearing device according to claim 7, wherein the radial dynamic pressure generating portion further comprises hill portions configured to prevent outflow of lubricating oil from the polygonal groove portions.

9. The fluid dynamic bearing device according to claim 8, wherein the connection groove portions comprise:
   a first connection groove portion configured to connect polygonal groove portions located on an upper side and a lower side in an axial direction; and
   a second connection groove portion configured to connect, in a circumferential direction, polygonal groove portions, and
wherein a sectional area of the first connection groove portion is set to be larger than a sectional area of the second connection groove portion.

10. The fluid dynamic bearing device according to claim 7, wherein the connection groove portions comprise:
   a first connection groove portion configured to connect polygonal groove portions located on an upper side and a lower side in an axial direction; and
   a second connection groove portion configured to connect, in a circumferential direction, polygonal groove portions, and
wherein a sectional area of the first connection groove portion is set to be larger than a sectional area of the second connection groove portion.

11. The fluid dynamic bearing device according to claim 1, wherein the radial dynamic pressure generating portion further comprises hill portions configured to prevent outflow of lubricating oil from the polygonal groove portions.

12. The fluid dynamic bearing device according to claim 11, wherein the connection groove portions comprise:
   a first connection groove portion configured to connect polygonal groove portions located on an upper side and a lower side in an axial direction; and
   a second connection groove portion configured to connect, in a circumferential direction, polygonal groove portions, and
wherein a sectional area of the first connection groove portion is set to be larger than a sectional area of the second connection groove portion.

13. The fluid dynamic bearing device according to claim 1, wherein the connection groove portions comprise:
   a first connection groove portion configured to connect polygonal groove portions located on an upper side and a lower side in an axial direction; and
   a second connection groove portion configured to connect, in a circumferential direction, polygonal groove portions, and
wherein a sectional area of the first connection groove portion is set to be larger than a sectional area of the second connection groove portion.

* * * * *